(12) United States Patent
Zhong et al.

(10) Patent No.: US 10,910,840 B2
(45) Date of Patent: Feb. 2, 2021

(54) METHOD AND APPARATUS FOR PHOTOVOLTAIC POWER FORECAST BASED ON NUMERICAL WEATHER PREDICTION

(71) Applicants: TSINGHUA UNIVERSITY, Beijing (CN); BEIJING TSINTERGY TECHNOLOGY CO., LTD., Beijing (CN)

(72) Inventors: Haiwang Zhong, Beijing (CN); Jianxiao Wang, Beijing (CN); Yang Wang, Beijing (CN); Xiaowen Lai, Beijing (CN); Qing Xia, Beijing (CN); Chongqing Kang, Beijing (CN)

(73) Assignees: TSINGHUA UNIVERSITY, Beijing (CN); BEIJING TSINTERGY TECHNOLOGY CO., LTD., Beijing (CN)

( * ) Notice: Subject to any disclaimer, the term of this patent is extended or adjusted under 35 U.S.C. 154(b) by 331 days.

(21) Appl. No.: 15/992,244

(22) Filed: May 30, 2018

(65) Prior Publication Data
US 2018/0375334 A1 Dec. 27, 2018

(30) Foreign Application Priority Data
Jun. 26, 2017 (CN) .......................... 2017 1 0492720

(51) Int. Cl.
*H02J 3/38* (2006.01)
*G01W 1/10* (2006.01)
(Continued)

(52) U.S. Cl.
CPC .............. *H02J 3/383* (2013.01); *G01W 1/10* (2013.01); *G01W 1/12* (2013.01); *G06N 7/005* (2013.01);
(Continued)

(58) Field of Classification Search
None
See application file for complete search history.

(56) References Cited

U.S. PATENT DOCUMENTS

| 2016/0104084 | A1* | 4/2016 | Philip | G06Q 10/06311 |
| | | | | 705/7.13 |
| 2018/0046924 | A1* | 2/2018 | Huang | H02J 3/381 |

(Continued)

OTHER PUBLICATIONS

Wen, "An Investigation of the Effect of Wind Cooling on Photovoltaic Arrays", Mar. 1982, Jet Propulsion Laboratory (Year: 1982).*

*Primary Examiner* — Brent A. Fairbanks
(74) *Attorney, Agent, or Firm* — Hodgson Russ LLP (57) ABSTRACT

The present disclosure provides a method and an apparatus for photovoltaic power forecast based on numerical weather prediction. The method includes: determining a historical key weather feature matrix and a prediction key weather feature matrix; determining a historical weather data matrix and a prediction weather data matrix; determining a historical input matrix and a prediction input matrix; combining the historical input matrix and the prediction input matrix; performing singular value decomposition on the combined input matrix to obtain a principal component feature matrix; determining K principal component features corresponding to K historical time periods having the nearest Manhattan distances with the prediction time period; acquiring a fitting relationship according to the K principal component features and K photovoltaic powers corresponding to the K historical time periods; inputting the principal component feature corresponding to the prediction time period to the fitting relationship to obtain a photovoltaic power.

15 Claims, 3 Drawing Sheets

(51) Int. Cl.
  *G01W 1/12* (2006.01)
  *H02J 3/00* (2006.01)
  *G06N 7/00* (2006.01)
  *G06N 3/02* (2006.01)
  *G06N 20/10* (2019.01)

(52) U.S. Cl.
  CPC .............. *H02J 3/004* (2020.01); *H02J 3/381* (2013.01); *G06N 3/02* (2013.01); *G06N 20/10* (2019.01); *H02J 2203/20* (2020.01); *H02J 2300/24* (2020.01); *Y04S 40/20* (2013.01)

(56) References Cited

U.S. PATENT DOCUMENTS

2018/0175790 A1\* 6/2018 Sanfilippo ............... H02S 50/10
2018/0225416 A1\* 8/2018 Wong ..................... G16B 25/00

\* cited by examiner

METHOD AND APPARATUS FOR PHOTOVOLTAIC POWER FORECAST BASED ON NUMERICAL WEATHER PREDICTION

CROSS REFERENCE TO RELATED APPLICATION

This application is based upon and claims a priority to Chinese Patent Application Serial No. 201710492720.8, filed with the State Intellectual Property Office of P. R. China on Jun. 26, 2017, the entire contents of which are incorporated herein by reference.

TECHNICAL FIELD

The present disclosure relates to a field of new energy technologies in power systems, and more particularly, to a method for photovoltaic power forecast based on numerical weather prediction, an apparatus for photovoltaic power forecast based on numerical weather prediction and a computer-readable storage medium.

BACKGROUND

The photovoltaic power station is a typical intermittent power source because it can only generate electricity by daylight. The photovoltaic power of the photovoltaic power station has great volatility and randomness due to the influence of weather and environment on the photovoltaic power station. Therefore, it may cause adverse effects on power grids when large-scale photovoltaic power stations are merged into power grids.

SUMMARY

Embodiments of the present disclosure provide a method for photovoltaic power forecast based on numerical weather prediction. The method includes: reading from a computer storage device, a plurality of first effective light intensities corresponding to a plurality of historical time periods and a plurality of first photovoltaic array temperatures corresponding to the plurality of historical time periods; reading from the computer storage device, a plurality of second effective light intensities corresponding to a plurality of prediction time periods and a plurality of second photovoltaic array temperatures corresponding to the plurality of prediction time periods; determining a historical key weather feature matrix based on the plurality of first effective light intensities and the plurality of first photovoltaic array temperatures; determining a prediction key weather feature matrix based on the plurality of second effective light intensities and the plurality of second photovoltaic array temperatures; reading from the computer storage device, a plurality of first groups of weather data corresponding to the plurality of historical time periods; determining a historical weather data matrix based on the plurality of first groups of weather data; reading from the computer storage device, a plurality of second groups of weather data corresponding to the plurality of prediction time periods; determining a prediction weather data matrix based on the plurality of second groups of weather data; determining a historical input matrix based on the historical key weather feature matrix and the historical weather data matrix; determining a prediction input matrix based on the prediction key weather feature matrix and the prediction weather data matrix; combining the historical input matrix and the prediction input matrix to determine an input matrix; performing singular value decomposition on the input matrix to obtain a principal component feature matrix; for a principal component feature corresponding to each prediction time period in the principal component feature matrix, calculating a Manhattan distance between the principal component feature corresponding to each prediction time period and a principal component feature corresponding to each historical time period; determining K principal component features corresponding to K historical time periods having the nearest Manhattan distances with the principal component feature corresponding to each prediction time period; acquiring a fitting relationship according to the K principal component features corresponding to the K historical time periods and K photovoltaic powers corresponding to the K historical time periods; inputting the principal component feature corresponding to each prediction time period to the fitting relationship to obtain a photovoltaic power corresponding to each prediction time period.

Embodiments of the present disclosure provide an apparatus for photovoltaic power forecast based on numerical weather prediction. The apparatus includes a computer storage device, a processor and computer programs stored in the computer storage device and executable by the processor. The computer storage device is configured to store a plurality of first effective light intensities corresponding to a plurality of historical time periods and a plurality of first photovoltaic array temperatures corresponding to the plurality of historical time periods, a plurality of second effective light intensities corresponding to a plurality of prediction time periods and a plurality of second photovoltaic array temperatures corresponding to the plurality of prediction time periods, a plurality of first groups of weather data corresponding to the plurality of historical time periods, and a plurality of second groups of weather data corresponding to the plurality of prediction time periods. The processor is configured to by reading the computer programs to: read from the computer storage device the plurality of first effective light intensities corresponding to the plurality of historical time periods and the plurality of first photovoltaic array temperatures corresponding to the plurality of historical time periods; read from the computer storage device the plurality of second effective light intensities corresponding to the plurality of prediction time periods and the plurality of second photovoltaic array temperatures corresponding to the plurality of prediction time periods; determine a historical key weather feature matrix based on the plurality of first effective light intensities and the plurality of first photovoltaic array temperatures; determine a prediction key weather feature matrix based on the plurality of second effective light intensities and the plurality of second photovoltaic array temperatures; read from the computer storage device the plurality of first groups of weather data corresponding to the plurality of historical time periods; determine a historical weather data matrix based on the plurality of first groups of weather data; read from the computer storage device the plurality of second groups of weather data corresponding to the plurality of prediction time periods; determine a prediction weather data matrix based on the plurality of second groups of weather data; determine a historical input matrix based on the historical key weather feature matrix and the historical weather data matrix; determine a prediction input matrix based on the prediction key weather feature matrix and the prediction weather data matrix; combine the historical input matrix and the prediction input matrix to determine an input matrix; perform singular value decomposition on the input matrix to obtain a principal component feature matrix; for a principal component feature corresponding to each prediction time period in the principal component feature matrix, calculate a Manhattan distance between the principal component feature corresponding to each prediction time period and a principal component feature corresponding to each historical time period; determine K principal component features corresponding to K historical time periods having the nearest Manhattan distances with the principal component feature corresponding to each prediction time period; acquire a fitting relationship according to the K principal component features corresponding to the K historical time periods and K photovoltaic powers corresponding to the K historical time periods; input the principal component feature corresponding to each prediction time period to the fitting relationship to obtain a photovoltaic power corresponding to each prediction time period.

Embodiments of the present disclosure provide a non-transitory computer-readable storage medium having stored therein instructions. When the instructions are executed by a processor of a device, causes the device to perform acts of: reading from a computer storage device, a plurality of first effective light intensities corresponding to a plurality of historical time periods and a plurality of first photovoltaic array temperatures corresponding to the plurality of historical time periods; reading from the computer storage device, a plurality of second effective light intensities corresponding to a plurality of prediction time periods and a plurality of second photovoltaic array temperatures corresponding to the plurality of prediction time periods; determining a historical key weather feature matrix based on the plurality of first effective light intensities and the plurality of first photovoltaic array temperatures; determining a prediction key weather feature matrix based on the plurality of second effective light intensities and the plurality of second photovoltaic array temperatures; reading from the computer storage device, a plurality of first groups of weather data corresponding to the plurality of historical time periods; determining a historical weather data matrix based on the plurality of first groups of weather data; reading from the computer storage device, a plurality of second groups of weather data corresponding to the plurality of prediction time periods; determining a prediction weather data matrix based on the plurality of second groups of weather data; determining a historical input matrix based on the historical key weather feature matrix and the historical weather data matrix; determining a prediction input matrix based on the prediction key weather feature matrix and the prediction weather data matrix; combining the historical input matrix and the prediction input matrix to determine an input matrix; performing singular value decomposition on the input matrix to obtain a principal component feature matrix; for a principal component feature corresponding to each prediction time period in the principal component feature matrix, calculating a Manhattan distance between the principal component feature corresponding to each prediction time period and a principal component feature corresponding to each historical time period; determining K principal component features corresponding to K historical time periods having the nearest Manhattan distances with the principal component feature corresponding to each prediction time period; acquiring a fitting relationship according to the K principal component features corresponding to the K historical time periods and K photovoltaic powers corresponding to the K historical time periods; inputting the principal component feature corresponding to each prediction time period to the fitting relationship to obtain a photovoltaic power corresponding to each prediction time period.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

The embodiments of the present disclosure disclose a method for photovoltaic power forecast based on numerical weather prediction. The method combines a physical model of the photovoltaic power with data-driven functionality.

In detail, the physical model of the photovoltaic power is denoted by a formula of:

$$P_{mp} = P_{mp0} \frac{E_e}{E_0} [1 + \gamma(T_c - T_0)], \tag{1}$$

where, $P_{mp}$ denotes the photovoltaic power; $E_e$ denotes an effective light intensity; $T_c$ denotes the temperature of a photovoltaic array; $E_0$ denotes a reference light intensity ($E_0$ is a constant value, for example, 1000 W/m$^2$); $T_0$ denotes a reference temperature ($T_0$ is a constant value, for example, 25° C.); $P_{mp0}$ denotes a photovoltaic rating power; and $\gamma$ denotes a temperature coefficient of the photovoltaic array ($\gamma$ is a constant value, depending on factors such as material of the photovoltaic array).

It can be known from the physical model of the photovoltaic power that weather features directly related to the photovoltaic power are the effective light intensity and the photovoltaic array temperature.

Based on the physical model of the photovoltaic power, a linear expression of the photovoltaic power with respect to the effective light intensity and the photovoltaic array temperature is denoted by a formula of:

$$P_{mp} = P_{mp0} \frac{E_e}{E_0}[1 + \gamma(T_c - T_0)] \qquad (2)$$
$$= (1 - \gamma T_0)\frac{P_{mp0}}{E_0} E_e + \gamma \frac{P_{mp0}}{E_0} E_e T_c,$$

where, the formula (2) is the linear expression of $P_{mp}$ with respect to $E_e$ and $E_e \cdot T_c$. Therefore, $E_e$ and $E_e \cdot T_c$ are marked as key weather features that affects the photovoltaic power.

The computer can calculate the above effective light intensities and the above photovoltaic array temperatures and record them into the computer storage device.

In an embodiment of the present disclosure, calculating the effective light intensity includes the following acts (1-1), (1-2), (1-3) and (1-4).

(1-1) A direct sunlight component, a ground reflection component and a sky diffuse component are acquired by a light intensity meter, or through a weather database.

(1-2) A photovoltaic array light intensity is acquired based on the direct sunlight component, the ground reflection component and the sky diffuse component by a formula of:

$$E_{POA} = E_b + E_g + E_d \qquad (3),$$

where, $E_{POA}$ denotes the photovoltaic array light intensity; $E_b$ denotes the direct sunlight component; $E_g$ denotes the ground reflection component; and $E_d$ denotes the sky diffuse component.

(1-3) A photovoltaic array cleanliness is measured.

The photovoltaic array cleanliness may be determined by field experiments.

(1-4) The effective light intensity is acquired based on the photovoltaic array cleanliness and the photovoltaic array light intensity by a formula of:

$$E_e = E_{POA} \cdot SF \qquad (4),$$

where, SF denotes the photovoltaic array cleanliness and $SF \in [0,1]$. When $SF=1$, it indicates that the photovoltaic array is completely clean.

In an embodiment of the present disclosure, calculating the photovoltaic array temperature includes the following acts (2-1), (2-2), (2-3) and (2-4).

(2-1) The direct sunlight component, the ground reflection component and the sky diffuse component are acquired based on the act (1-1).

(2-2) The photovoltaic array light intensity is acquired based on the act (1-2).

(2-3) A wind speed and an ambient temperature are measured.

(2-4) The photovoltaic array temperature is acquired based on the photovoltaic array light intensity, the wind speed and the ambient temperature by a formula of $$T_c = T_a + \frac{E_{POA}}{U_0 + U_1 \cdot WS} + \frac{E_{POA}}{E_0} \Delta T \qquad (5)$$

where, $T_a$ denotes the ambient temperature; WS denotes the wind speed; $\Delta T$ denotes a temperature difference coefficient of the photovoltaic array and indicates a temperature difference between the photovoltaic array and the photovoltaic element, which is related to factors such as material of the photovoltaic array, in which $\Delta T>0$; $U_0$ denotes a thermal conductivity constant of the photovoltaic array, for example, 25 W/m²K; and $U_1$ denotes a thermal convection constant of the photovoltaic array, for example, 6.84 W/m³sK.

Figure 1:
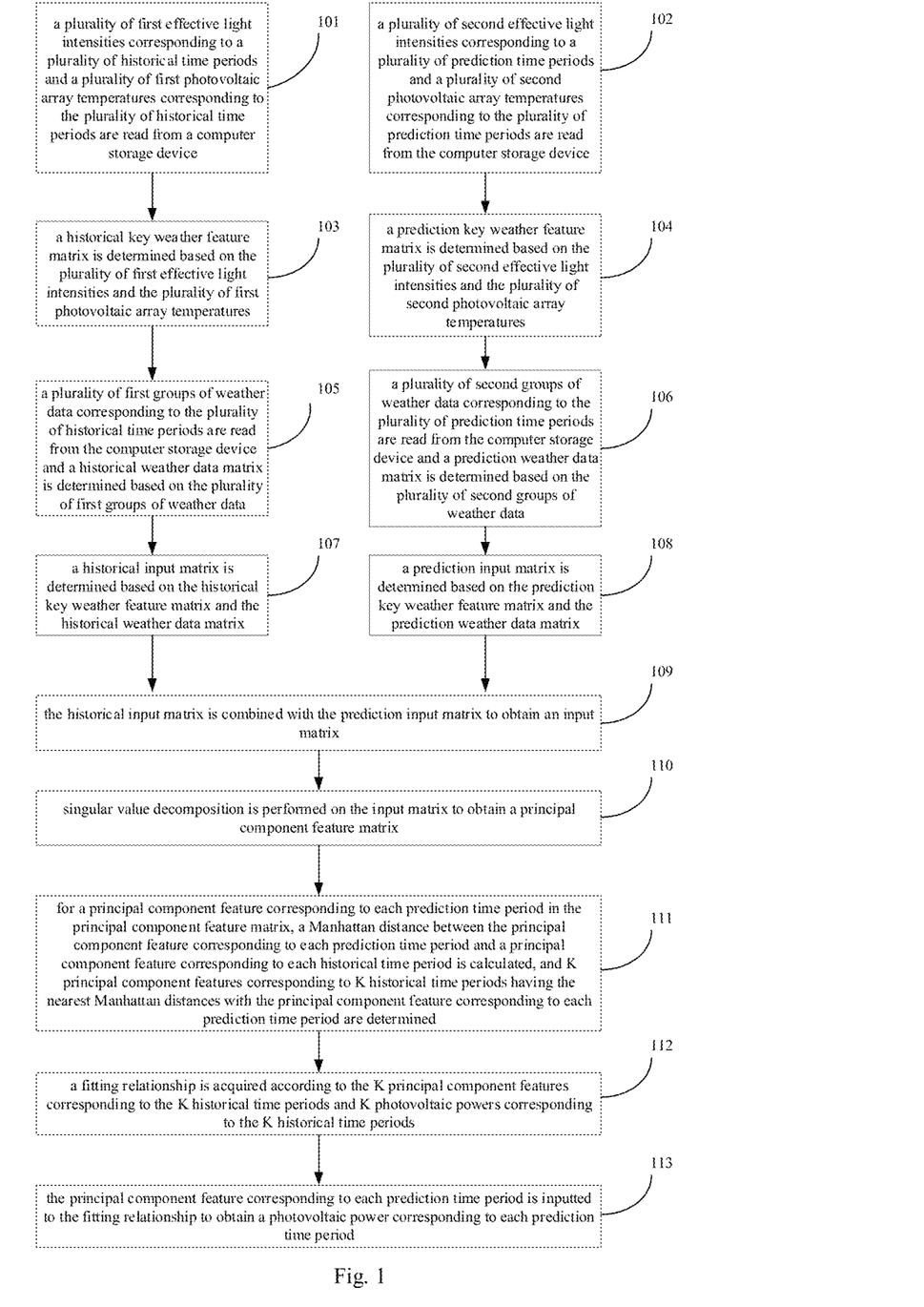
FIG. 1 is a flow chart of a method for photovoltaic power forecast based on numerical weather prediction according to an embodiment of the present disclosure.

FIG. 1 is a flow chart of a method for photovoltaic power forecast based on numerical weather prediction according to an embodiment of the present disclosure. As illustrated in FIG. 1, the method includes acts in the following blocks.

At block 101, a plurality of first effective light intensities corresponding to a plurality of historical time periods and a plurality of first photovoltaic array temperatures corresponding to the plurality of historical time periods are read from a computer storage device.

At block 102, a plurality of second effective light intensities corresponding to a plurality of prediction time periods and a plurality of second photovoltaic array temperatures corresponding to the plurality of prediction time periods are read from the computer storage device.

In the embodiments of the present disclosure, acts in block 101 and block 102 are executed in a non-sequential order.

At block 103, a historical key weather feature matrix is determined based on the plurality of first effective light intensities and the plurality of first photovoltaic array temperatures.

In an embodiment of the present disclosure, each historical time period is one sampling unit time. That is, the unit time for acquiring photovoltaic power data and weather data. The length of each historical time period is not limited, generally from 15 minutes to 1 hour. For example, this embodiment selects 1 hour.

For any historical time period $t \in \{1, 2 \ldots T^h\}$, $T^h$ denotes the number of the plurality of historical time periods and depends on a size of historical data samples. For example, the number of historical time periods in this embodiment is 8760 hours per year. Assuming that the first effective light intensity in the historical time period t is denoted as $E_e^h[t]$ and the first photovoltaic array temperature in the historical time period t is denoted as $T_c^h[t]$, the historical key weather feature matrix $X_C^h$ in the plurality of historical time periods is denoted as follows:

$$X_C^h = \begin{bmatrix} E_e^h[1] & E_e^h[1] \cdot T_c^h[1] \\ E_e^h[2] & E_e^h[2] \cdot T_c^h[2] \\ \vdots & \vdots \\ E_e^h[T^h] & E_e^h[T^h] \cdot T_c^h[T^h] \end{bmatrix}. \qquad (6)$$

At block 104, a prediction key weather feature matrix is determined based on the plurality of second effective light intensities and the plurality of second photovoltaic array temperatures.

In an embodiment of the present disclosure, each prediction time period is one sampling unit time. The length of each prediction time period is the same with that of each historical time period.

For any prediction time period $t \in \{1, 2 \ldots T^f\}$, $T^f$ denotes the number of the plurality of prediction time periods and depends on a size of prediction data samples. For example, the number of prediction time periods in this embodiment is 168 hours per week. Assuming that the second effective light intensity in the prediction time period t is denoted as $E_e^f[t]$ and the second photovoltaic array temperature in the prediction time period t is denoted as $T_e^f[t]$, the prediction key weather feature matrix $X_C^f$ in the plurality of prediction time periods is denoted as follows:

$$X_C^f = \begin{bmatrix} E_e^f[1] & E_e^f[1] \cdot T_c^f[1] \\ E_e^f[2] & E_e^f[2] \cdot T_c^f[2] \\ \vdots & \vdots \\ E_e^f[T^f] & E_e^f[T^f] \cdot T_c^f[T^f] \end{bmatrix}. \quad (7)$$

In the embodiments of the present disclosure, acts in block 103 and block 104 are executed in a non-sequential order.

At block 105, a plurality of first groups of weather data corresponding to the plurality of historical time periods are read from the computer storage device and a historical weather data matrix is determined based on the plurality of first groups of weather data.

The historical database of numerical weather forecasts can be stored in the computer storage device. From the historical database, the plurality of first groups of weather data corresponding to the plurality of historical time periods can be acquired. Each first group of weather data may include one or more of an atmospheric pressure, an air sediment, an air humidity, a sky cloud volume, a wind speed, an air temperature and a surface heat radiation. The air sediment refers to a particulate matter deposited in the air.

The historical weather data matrix $X_W^h \in R^{T^h \times N}$ is determined based on the plurality of first groups of weather data. Each row of the matrix represents a historical time period. Each column of the matrix represents one type of weather data, and the number of the types of weather data is N. The value of N depends on the number of physical quantities related to the photovoltaic power in the historical database. For example, in this embodiment, N is 7, which are: the atmospheric pressure, the air sediment, the air humidity, the sky cloud volume, the wind speed, the air temperature and the surface heat radiation.

At block 106, a plurality of second groups of weather data corresponding to the plurality of prediction time periods are read from the computer storage device and a prediction weather data matrix is determined based on the plurality of second groups of weather data.

The prediction database of numerical weather forecasts can be stored in the computer storage device. From the prediction database, the plurality of second groups of weather data corresponding to the plurality of prediction time periods can be acquired. Each second group of weather data may include one or more of an atmospheric pressure, an air sediment, an air humidity, a sky cloud volume, a wind speed, an air temperature and a surface heat radiation.

The prediction weather data matrix $X_W^f \in R^{T^f \times N}$ is determined based on the plurality of second groups of weather data. Each row of the matrix represents a prediction time period. Each column of the matrix represents one type of weather data, and the number of the types of weather data is N. The value of N depends on the number of physical quantities related to the photovoltaic power in the prediction database. For example, in this embodiment, the types of weather data in the prediction time periods are the same with that in the historical time periods.

In the embodiments of the present disclosure, acts in block 105 and block 106 are executed in a non-sequential order.

At block 107, a historical input matrix is determined based on the historical key weather feature matrix and the historical weather data matrix.

At block 108, a prediction input matrix is determined based on the prediction key weather feature matrix and the prediction weather data matrix.

In the embodiments of the present disclosure, acts in block 107 and block 108 are executed in a non-sequential order.

The historical input matrix is denoted by a formula of:

$$X_I^h = [X_C^h, X_W^h] \quad (8).$$

The prediction input matrix is denoted by a formula of:

$$X_I^f = [X_C^f, X_W^f] \quad (8).$$

At block 109, the historical input matrix is combined with the prediction input matrix to obtain an input matrix.

The input matrix is denoted by $$\begin{bmatrix} X_I^h \\ X_I^f \end{bmatrix}.$$

At block 110, singular value decomposition is performed on the input matrix to obtain a principal component feature matrix.

The principal component analysis is applied to the combined input matrix to extract features of the historical input matrix and the prediction input matrix.

The principal component analysis converts a group of variables that may have correlation with each other into a group of linearly uncorrelated variables, thereby reducing redundancy of the input matrix and extracting the principal component features.

The singular value decomposition is performed on the input matrix $$\begin{bmatrix} X_I^h \\ X_I^f \end{bmatrix}$$

to obtain a principal component feature matrix $$\begin{bmatrix} X_P^h \\ X_P^f \end{bmatrix},$$

where, $X_P^h \in R^{T^h \times L}$ denotes a principal component feature matrix of the historical time periods, $X_P^f \in R^{T^f \times L}$ denotes a principal component feature matrix of the prediction time periods, and L denotes the number of the principal component features.

At block 111, for a principal component feature corresponding to each prediction time period in the principal component feature matrix, a Manhattan distance between the principal component feature corresponding to each prediction time period and a principal component feature corresponding to each historical time period is calculated, and K principal component features corresponding to K historical time periods having the nearest Manhattan distances with the principal component feature corresponding to each prediction time period are determined.

In detail, the K historical time periods closest to the prediction time period are determined based on a K-nearest neighbor clustering method. That is, for any prediction time period $t \in \{1, 2 \ldots T'\}$, the Manhattan distance between the principal component feature corresponding to this prediction time period and the principal component feature corresponding to each historical time period is calculated, and the K historical time periods having the nearest Manhattan distances are selected. The value of K may affect prediction effect. The best value of K can be determined by parameter sensitivity analysis during cross-checking. For example, K=300 is used in this embodiment.

At block 112, a fitting relationship is acquired according to the K principal component features corresponding to the K historical time periods and K photovoltaic powers corresponding to the K historical time periods.

Based on support vector machine, the relationship between the principal component features of the K historical time periods closest to the prediction time period and the photovoltaic powers corresponding to the K historical time periods closest to the prediction time period may be fitted. The fitting relationship of the prediction time period t is obtained as: $g_t: R^{1 \times L} \rightarrow R^{1 \times 1}$, where, $g_t$ represents a mapping function.

At block 113, the principal component feature corresponding to each prediction time period is inputted to the fitting relationship to obtain a photovoltaic power corresponding to each prediction time period.

In detail, the principal component feature corresponding to the prediction time period t is inputted to the fitting relationship $g_t$ to obtain the photovoltaic power corresponding to the prediction time period t.

In the related art, the method for predicting the photovoltaic power of the photovoltaic power station mainly includes the followings.

(1) Collect weather data of the historical time periods, such as the atmospheric pressure, the air sediment, the air humidity, the sky cloud volume, the wind speed, the air temperature and the surface heat radiation.

(2) Use the weather data of the historical time periods as input directly. Through data-driven algorithms, such as neural network or support vector machine, the relationship between historical weather data and historical photovoltaic power is statistically learned.

(3) Collect weather data of the prediction time periods. Input this weather data directly to the relationship statistically learned between historical weather data and historical photovoltaic power, so as to obtain the photovoltaic powers of the prediction time periods.

However, the method in the related art strongly rely on statistical learning abilities of the data-driven algorithms such as neural networks and support vector machines and ignore the role of the physical model of the photovoltaic power on the data-driven algorithms. The physical model of the photovoltaic power represents an analytical formula among the photovoltaic power and weather features such as ambient temperature, wind speed and surface light intensity, and implies the physical law among the photovoltaic power and weather features.

Figure 2:
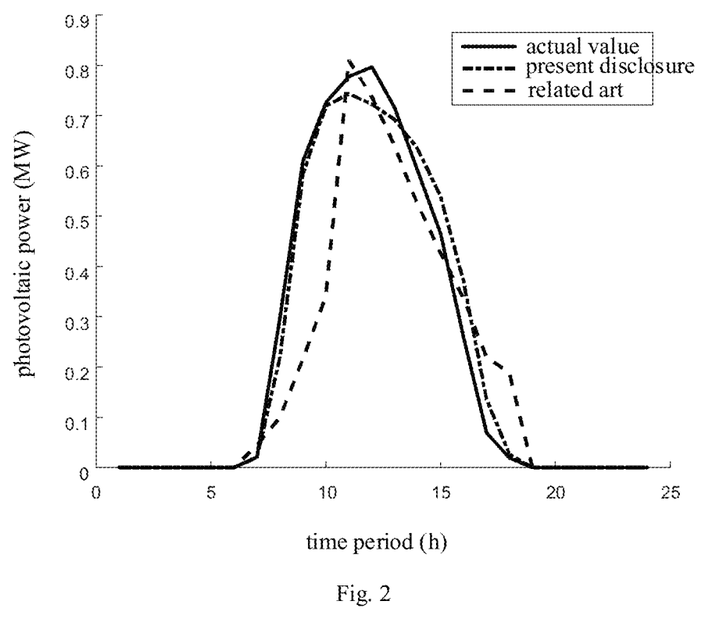
FIG. 2 is a schematic diagram illustrating daily prediction curves of a method for photovoltaic power forecast based on numerical weather prediction according to an embodiment of the present disclosure and a method for photovoltaic power forecast based on numerical weather prediction according to the related art.
Figure 3:
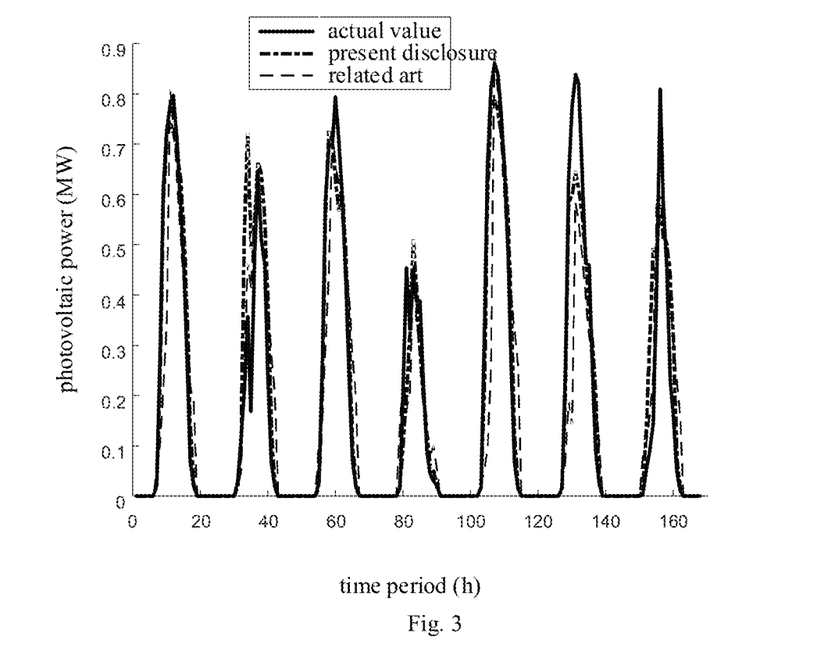
FIG. 3 is a schematic diagram illustrating weekly prediction curves of a method for photovoltaic power forecast based on numerical weather prediction according to an embodiment of the present disclosure and a method for photovoltaic power forecast based on numerical weather prediction according to the related art.

The calculation results of the method for predicting the photovoltaic power of the photovoltaic power station according to the embodiments of the present disclosure are compared with that of the method for predicting the photovoltaic power of the photovoltaic power station according to the related art, which are illustrated in FIGS. 2 and 3. All the data comes from the open source data of the 2014 Global Load Forecasting Competition (GEFCom 2014). The data-driven method adopted by the method in the related art is consistent with that adopted by the method in the present disclosure, i.e., principal component analysis, the K-nearest neighbor clustering and the support vector machine. FIG. 2 is a schematic diagram illustrating daily prediction curves of a method for photovoltaic power forecast based on numerical weather prediction according to an embodiment of the present disclosure and a method for photovoltaic power forecast based on numerical weather prediction according to the related art. FIG. 3 is a schematic diagram illustrating weekly prediction curves of a method for photovoltaic power forecast based on numerical weather prediction according to an embodiment of the present disclosure and a method for photovoltaic power forecast based on numerical weather prediction according to the related art. From FIG. 2 and FIG. 3, it may be known that, compared with the method in the related art, the method according to the embodiments of the present disclosure may obtain higher prediction accuracy in daily and weekly.

The embodiments of the present disclosure provide the method for predicting the photovoltaic power of the photovoltaic power station by aiming at practical demands in industry and academia and considering deficiencies of data-driven methods in the related art. The method combines the physical model of the photovoltaic power with the data-driven functionality. The method determines the key weather features affecting the photovoltaic power through the physical model of the photovoltaic power, further uses the data-driven method to fit the relationship among the key features and the photovoltaic power, and accurately predicts the photovoltaic power. The present disclosure has significant improvement in the prediction accuracy.

Figure 4:
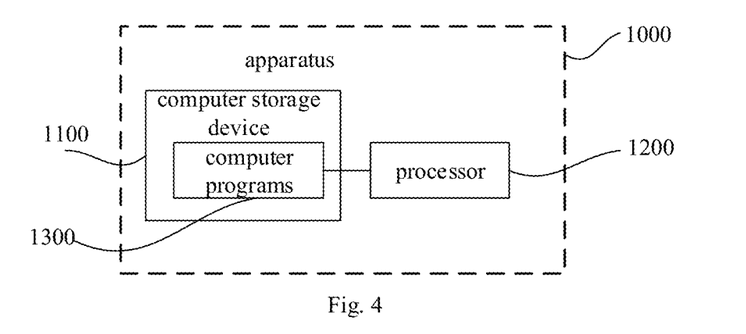
FIG. 4 is a block diagram illustrated an apparatus for photovoltaic power forecast based on numerical weather prediction according to an embodiment of the present disclosure.

To achieve the above embodiments, the present disclosure further provides an apparatus for photovoltaic power forecast based on numerical weather prediction. FIG. 4 is a block diagram illustrated an apparatus for photovoltaic power forecast based on numerical weather prediction according to an embodiment of the present disclosure. As illustrated in FIG. 4, the apparatus 1000 may include a computer storage device 1100, a processor 1200 and computer programs 1300 stored in the computer storage device 1100 and executable by the processor 1200. The computer storage device 1100 is configured to store data and the computer programs 1300. The processor 1200 is configured to execute the computer programs 1300 to implement the above method according to any one of the above embodiments of the present disclosure.

To achieve the above embodiments, the present disclosure further provides non-transitory computer-readable storage medium having stored therein computer programs. When the computer programs are executed by a processor, the above method according to any one of the above embodiments of the present disclosure is implemented.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine the different embodiments or examples described in this specification and features of different embodiments or examples without conflicting with each other.

Terms such as "first" and "second" are used herein for purposes of description and are not intended to indicate or imply relative importance or significance or imply the number of technical features. Furthermore, the feature defined by "first" or "second" may indicate or imply including at least one feature. In the description of the present disclosure, "a plurality or refers to two or more unless otherwise specified.

Any process or method described in a flow chart or described herein in other ways may be understood to include one or more modules, segments or portions of" codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

Any process or method described in a flow chart or described herein in other ways may be understood to be a sequence table of executable instructions for achieving logical functions, which may be realized in any computer-readable medium for being used by the instruction execution system, device or apparatus (for example, the system based on the computer, the system including the processor or other systems capable of reading instructions from the instruction execution system, device or apparatus and executing the instructions) or being used in combination with the instruction execution system, device or apparatus. In the specification, "computer-readable medium" may be any device including, storing, communicating, broadcasting or transmitting programs for being used by the instruction execution system, device or apparatus or being used in combination with the instruction execution system, device or apparatus. Specific examples of the computer-readable medium (non-exhaustiveness list) include: electrical connection (electronic device) having one or one wires, portable computer disk box (magnetic device), random access memory (RAM), read only memory (ROM), electrically programmable read-only-memory (EPROM or flash memory), fiber device, and portable CD-ROM. In addition, the computer-readable medium may even to paper on which programs can be printed or other appropriate medium, this is because optical scanning may be performed on the paper or the other medium, and then edit, interpretation or any other appropriate way if necessary are performed to electrically obtain the programs, and then the programs are stored in the computer storage.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for photovoltaic power forecast based on numerical weather prediction, comprising:

reading from a computer storage device, a plurality of first effective light intensities corresponding to a plurality of historical time periods and a plurality of first photovoltaic array temperatures corresponding to the plurality of historical time periods;

reading from the computer storage device, a plurality of second effective light intensities corresponding to a plurality of prediction time periods and a plurality of second photovoltaic array temperatures corresponding to the plurality of prediction time periods;

determining a historical key weather feature matrix based on the plurality of first effective light intensities and the plurality of first photovoltaic array temperatures as a matrix of:

$$X_C^h = \begin{bmatrix} E_e^h[1] & E_e^h[1] \cdot T_c^h[1] \\ E_e^h[2] & E_e^h[2] \cdot T_c^h[2] \\ \vdots & \vdots \\ E_e^h[T^h] & E_e^h[T^h] \cdot T_c^h[T^h] \end{bmatrix}$$

where, t denotes a historical time period and $t \in \{1, 2 \ldots T^h\}$ $T^h$ denotes the number of the plurality of historical time periods; $E_e^h[t]$ denotes the first effective light intensity of the historical time period t; $T_c^h[t]$ denotes the first photovoltaic array temperature of the historical time period t; and $X_C^h$ denotes the historical key weather feature matrix;

determining a prediction key weather feature matrix based on the plurality of second effective light intensities and the plurality of second photovoltaic array temperatures as a matrix of:

$$X_C^f = \begin{bmatrix} E_e^f[1] & E_e^f[1] \cdot T_c^f[1] \\ E_e^f[2] & E_e^f[2] \cdot T_c^f[2] \\ \vdots & \vdots \\ E_e^f[T^f] & E_e^f[T^f] \cdot T_c^f[T^f] \end{bmatrix}$$

where, t denotes a prediction time period and $t \in \{1, 2 \ldots T^f\}$; $T^f$ denotes the number of the plurality of prediction time periods; $E_e^f[t]$ denotes the second effective light intensity of the prediction time period t; $T_c^f[t]$ denotes the second photovoltaic array temperature of the prediction time period t; and $X_C^f$ denotes the prediction key weather feature matrix;

reading from the computer storage device, a plurality of first groups of weather data corresponding to the plurality of historical time periods;

determining a historical weather data matrix based on the plurality of first groups of weather data;

reading from the computer storage device, a plurality of second groups of weather data corresponding to the plurality of prediction time periods;

determining a prediction weather data matrix based on the plurality of second groups of weather data;

determining a historical input matrix based on the historical key weather feature matrix and the historical weather data matrix;

determining a prediction input matrix based on the prediction key weather feature matrix and the prediction weather data matrix;

combining the historical input matrix and the prediction input matrix to determine an input matrix;

performing singular value decomposition on the input matrix to obtain a principal component feature matrix;

for a principal component feature corresponding to each prediction time period in the principal component feature matrix, calculating a Manhattan distance between the principal component feature corresponding to each prediction time period and the same principal component feature corresponding to each one of all historical time periods;

determining K principal component features corresponding to K historical time periods having the nearest Manhattan distances with the principal component feature corresponding to each prediction time period;

obtaining K photovoltaic powers corresponding to the K historical time periods from a historical database;

acquiring a fitting relationship according to the K principal component features corresponding to the K historical time periods and K photovoltaic powers corresponding to the K historical time periods, the fitting relationship is acquired as $g_t$: $R^{1 \times L} \to R^{1 \times 1}$, where, $g_t$ represents a mapping function;

inputting the principal component feature corresponding to each prediction time period to the fitting relationship to obtain a photovoltaic power corresponding to each prediction time period.

2. The method according to claim 1, further comprising:
calculating the effective light intensity and recording the effective light intensity into the computer storage device.

3. The method according to claim 2, wherein calculating the effective light intensity comprises:
acquiring a direct sunlight component $E_b$, a ground reflection component $E_g$ and a sky diffuse component $E_d$ by a light intensity meter, or through a weather database;
acquiring a photovoltaic array light intensity $E_{POA}$ based on the direct sunlight component $E_b$, the ground reflection component $E_g$ and the sky diffuse component $E_d$ by a formula of:

$$E_{POA} = E_b + E_g + E_d;$$

measuring a photovoltaic array cleanliness $SF \in [0,1]$;

acquiring the effective light intensity $E_e$ based on the photovoltaic array cleanliness SF and the photovoltaic array light intensity $E_{POA}$ by a formula of:

$$E_e = E_{POA} \cdot SF.$$

4. The method according to claim 1, further comprising:
calculating the photovoltaic array temperature and recording the photovoltaic array temperature into the computer storage device.

5. The method according to claim 4, wherein calculating the photovoltaic array temperature comprises:
acquiring a direct sunlight component $E_b$, a ground reflection component $E_g$ and a sky diffuse component $E_d$ by a light intensity meter, or through a weather database;
acquiring a photovoltaic array light intensity $E_{POA}$ based on the direct sunlight component $E_b$, the ground reflection component $E_g$ and the sky diffuse component $E_d$ by a formula of:

$$E_{POA} = E_b + E_g + E_d.$$

measuring a wind speed WS and an ambient temperature $T_a$;
acquiring the photovoltaic array temperature $T_c$ based on the photovoltaic array light intensity $E_{POA}$, the wind speed WS and the ambient temperature $T_a$ by a formula of:

$$T_c = T_a + \frac{E_{POA}}{U_0 + U_1 \cdot WS} + \frac{E_{POA}}{E_0} \Delta T,$$

where, $\Delta T$ denotes a temperature difference coefficient of the photovoltaic array, $\Delta T > 0$; $U_0$ denotes a thermal conductivity constant of the photovoltaic array, and $U_1$ denotes a thermal convection constant of the photovoltaic array.

6. The method according to claim 1, wherein the weather data comprises one or more of an atmospheric pressure, an air sediment, an air humidity, a sky cloud volume, a wind speed, an air temperature and a surface heat radiation.

7. The method according to claim 1, wherein the K principal component features corresponding to the K historical time periods having the nearest Manhattan distances with the principal component feature corresponding to each prediction time period are determined based on a K-nearest neighbor clustering method.

8. An apparatus for photovoltaic power forecast based on numerical weather prediction, comprising:
a computer storage device, a processor and computer programs stored in the computer storage device and executable by the processor, wherein
the computer storage device is configured to store a plurality of first effective light intensities corresponding to a plurality of historical time periods and a plurality of first photovoltaic array temperatures corresponding to the plurality of historical time periods, a plurality of second effective light intensities corresponding to a plurality of prediction time periods and a plurality of second photovoltaic array temperatures corresponding to the plurality of prediction time periods, a plurality of first groups of weather data corresponding to the plurality of historical time periods, and a plurality of second groups of weather data corresponding to the plurality of prediction time periods;
a processor is configured to by reading the computer programs to:

read from the computer storage device the plurality of first effective light intensities corresponding to the plurality of historical time periods and the plurality of first photovoltaic array temperatures corresponding to the plurality of historical time periods;

read from the computer storage device the plurality of second effective light intensities corresponding to the plurality of prediction time periods and the plurality of second photovoltaic array temperatures corresponding to the plurality of prediction time periods;

determine a historical key weather feature matrix based on the plurality of first effective light intensities and the plurality of first photovoltaic array temperatures as a matrix of:

$$X_C^h = \begin{bmatrix} E_e^h[1] & E_e^h[1] \cdot T_c^h[1] \\ E_e^h[2] & E_e^h[2] \cdot T_c^h[2] \\ \vdots & \vdots \\ E_e^h[T^h] & E_e^h[T^h] \cdot T_c^h[T^h] \end{bmatrix}$$

where, t denotes a historical time period and $t \in \{1,2 \ldots T^h\}$; $T^h$ denotes the number of the plurality of historical time periods; $E_e^h[t]$ denotes the first effective light intensity of the historical time period t; $T_c^h[t]$ denotes the first photovoltaic array temperature of the historical time period t; and $X_C^h$ denotes the historical key weather feature matrix;

determine a prediction key weather feature matrix based on the plurality of second effective light intensities and the plurality of second photovoltaic array temperatures as a matrix of:

$$X_C^f = \begin{bmatrix} E_e^f[1] & E_e^f[1] \cdot T_c^f[1] \\ E_e^f[2] & E_e^f[2] \cdot T_c^f[2] \\ \vdots & \vdots \\ E_e^f[T^f] & E_e^f[T^f] \cdot T_c^f[T^f] \end{bmatrix}$$

where, t denotes a prediction time period and $t \in \{1, 2 \ldots T^f\}$; $T^f$ denotes the number of the plurality of prediction time periods; $E_e^f[t]$ denotes the second effective light intensity of the prediction time period t; $T_c^f[t]$ denotes the second photovoltaic array temperature of the prediction time period t; and $X_C^f$ denotes the prediction key weather feature matrix;

read from the computer storage device the plurality of first groups of weather data corresponding to the plurality of historical time periods;

determine a historical weather data matrix based on the plurality of first groups of weather data;

read from the computer storage device the plurality of second groups of weather data corresponding to the plurality of prediction time periods;

determine a prediction weather data matrix based on the plurality of second groups of weather data;

determine a historical input matrix based on the historical key weather feature matrix and the historical weather data matrix;

determine a prediction input matrix based on the prediction key weather feature matrix and the prediction weather data matrix;

combine the historical input matrix and the prediction input matrix to determine an input matrix;

perform singular value decomposition on the input matrix to obtain a principal component feature matrix;

for a principal component feature corresponding to each prediction time period in the principal component feature matrix, calculate a Manhattan distance between the principal component feature corresponding to each prediction time period and the same principal component feature corresponding to each one of all historical time periods;

determine K principal component features corresponding to K historical time periods having the nearest Manhattan distances with the principal component feature corresponding to each prediction time period;

obtain K photovoltaic powers corresponding to the K historical time periods from a historical database;

acquire a fitting relationship according to the K principal component features corresponding to the K historical time periods and K photovoltaic powers corresponding to the K historical time periods, the fitting relationship is acquired as $g_t: R^{1 \times L} \rightarrow R^{1 \times 1}$, where, $g_t$ represents a mapping function;

input the principal component feature corresponding to each prediction time period to the fitting relationship to obtain a photovoltaic power corresponding to each prediction time period.

9. The apparatus according to claim 8, wherein the processor is further configured to calculate the effective light intensity and record the effective light intensity into the computer storage device.

10. The apparatus according to claim 9, wherein the processor is configured to calculate the effective light intensity by acts of:

acquiring a direct sunlight component $E_b$, a ground reflection component $E_g$ and a sky diffuse component $E_d$ by a light intensity meter, or through a weather database;

acquiring a photovoltaic array light intensity $E_{POA}$ based on the direct sunlight component $E_b$, the ground reflection component $E_g$ and the sky diffuse component $E_d$ by a formula of:

$$E_{POA} = E_b + E_g + E_d;$$

measuring a photovoltaic array cleanliness $SF \in [0,1]$;

acquiring the effective light intensity $E_e$ based on the photovoltaic array cleanliness SF and the photovoltaic array light intensity $E_{POA}$ by a formula of:

$$E_e = E_{POA} \cdot SF.$$

11. The apparatus according to claim 8, wherein the processor is further configured to calculate the photovoltaic array temperature and record the photovoltaic array temperature into the computer storage device.

12. The apparatus according to claim 11, wherein the processor is configured to calculate the photovoltaic array temperature by acts of:

acquiring a direct sunlight component $E_b$, a ground reflection component $E_g$ and a sky diffuse component $E_d$ by a light intensity meter, or through a weather database;

acquiring a photovoltaic array light intensity $E_{POA}$ based on the direct sunlight component $E_b$, the ground reflection component $E_g$ and the sky diffuse component $E_d$ by a formula of:

$$E_{POA} = E_b + E_g + E_d;$$

measuring a wind speed WS and an ambient temperature $T_a$;

acquiring the photovoltaic array temperature $T_c$ based on the photovoltaic array light intensity $E_{POA}$, the wind speed WS and the ambient temperature $T_a$ by a formula of:

$$T_c = T_a + \frac{E_{POA}}{U_0 + U_1 \cdot WS} + \frac{E_{POA}}{E_0} \Delta T,$$

where, $\Delta T$ denotes a temperature difference coefficient of the photovoltaic array, $\Delta T > 0$; $U_0$ denotes a thermal conductivity constant of the photovoltaic array, and $U_1$ denotes a thermal convection constant of the photovoltaic array.

13. The apparatus according to claim 8, wherein the weather data comprises one or more of an atmospheric pressure, an air sediment, an air humidity, a sky cloud volume, a wind speed, an air temperature and a surface heat radiation.

14. The apparatus according to claim 8, wherein the K principal component features corresponding to the K historical time periods having the nearest Manhattan distances with the principal component feature corresponding to each prediction time period are determined based on a K-nearest neighbor clustering method.

15. A non-transitory computer-readable storage medium having stored therein instructions that, when executed by a processor of a device, causes the device to perform acts of:
reading from a computer storage device, a plurality of first effective light intensities corresponding to a plurality of historical time periods and a plurality of first photovoltaic array temperatures corresponding to the plurality of historical time periods;
reading from the computer storage device, a plurality of second effective light intensities corresponding to a plurality of prediction time periods and a plurality of second photovoltaic array temperatures corresponding to the plurality of prediction time periods;
determining a historical key weather feature matrix based on the plurality of first effective light intensities and the plurality of first photovoltaic array temperatures as a matrix of:

$$X_C^h = \begin{bmatrix} E_e^h[1] & E_e^h[1] \cdot T_c^h[1] \\ E_e^h[2] & E_e^h[2] \cdot T_c^h[2] \\ \vdots & \vdots \\ E_e^h[T^h] & E_e^h[T^h] \cdot T_c^h[T^h] \end{bmatrix}$$

where, t denotes a historical time period and $t \in \{1, 2 \ldots T^h\}$; $T^h$ denotes the number of the plurality of historical time periods; $E_e^h[t]$ denotes the first effective light intensity of the historical time period t; $T_c^h[t]$ denotes the first photovoltaic array temperature of the historical time period t; and $X_C^h$ denotes the historical key weather feature matrix;
determining a prediction key weather feature matrix based on the plurality of second effective light intensities and the plurality of second photovoltaic array temperatures as a matrix of:

$$X_C^f = \begin{bmatrix} E_e^f[1] & E_e^f[1] \cdot T_c^f[1] \\ E_e^f[2] & E_e^f[2] \cdot T_c^f[2] \\ \vdots & \vdots \\ E_e^f[T^f] & E_e^f[T^f] \cdot T_c^f[T^f] \end{bmatrix}$$

where, t denotes a prediction time period and $t \in \{1, 2 \ldots T^f\}$; $T^f$ denotes the number of the plurality of prediction time periods; $E_e^f[t]$ denotes the second effective light intensity of the prediction time period t; $T_c^f[t]$ denotes the second photovoltaic array temperature of the prediction time period t; and $X_C^f$ denotes the prediction key weather feature matrix;
reading from the computer storage device, a plurality of first groups of weather data corresponding to the plurality of historical time periods;
determining a historical weather data matrix based on the plurality of first groups of weather data;
reading from the computer storage device, a plurality of second groups of weather data corresponding to the plurality of prediction time periods;
determining a prediction weather data matrix based on the plurality of second groups of weather data;
determining a historical input matrix based on the historical key weather feature matrix and the historical weather data matrix;
determining a prediction input matrix based on the prediction key weather feature matrix and the prediction weather data matrix;
combining the historical input matrix and the prediction input matrix to determine an input matrix;
performing singular value decomposition on the input matrix to obtain a principal component feature matrix;
for a principal component feature corresponding to each prediction time period in the principal component feature matrix, calculating a Manhattan distance between the principal component feature corresponding to each prediction time period and the same principal component feature corresponding to each one of all historical time periods;
determining K principal component features corresponding to K historical time periods having the nearest Manhattan distances with the principal component feature corresponding to each prediction time period;
obtaining K photovoltaic powers corresponding to the K historical time periods from a historical database;
acquiring a fitting relationship according to the K principal component features corresponding to the K historical time periods and K photovoltaic powers corresponding to the K historical time periods, the fitting relationship is acquired as $g_t: R^{1 \times L} \to R^{1 \times 1}$, where, $g_t$ represents a mapping function;
inputting the principal component feature corresponding to each prediction time period to the fitting relationship to obtain a photovoltaic power corresponding to each prediction time period.

* * * * *